United States Patent [19] [11] 4,348,088
Yamamichi et al. [45] Sep. 7, 1982

[54] SINGLE LENS REFLEX CAMERA

[75] Inventors: Masayoshi Yamamichi, Kawasaki; Nobuo Tezuka, Tokyo, both of Japan

[73] Assignee: Canon Kabushiki Kaisha, Tokyo, Japan

[21] Appl. No.: 166,969

[22] Filed: Jul. 8, 1980

[30] Foreign Application Priority Data

Jul. 10, 1979 [JP] Japan .................................. 54-87115
Jul. 13, 1979 [JP] Japan .................................. 54-89113
Jul. 13, 1979 [JP] Japan .................................. 54-89116

[51] Int. Cl.³ .............................................. G03B 19/12
[52] U.S. Cl. ................................. 354/152; 354/59; 354/272
[58] Field of Search ............... 354/23 R, 59, 152, 153, 354/154, 272

[56] References Cited
U.S. PATENT DOCUMENTS 3,731,609 5/1973 Kobayashi et al. ................. 354/152
4,068,246 1/1978 Arai ..................................... 354/152

Primary Examiner—Russell E. Adams
Attorney, Agent, or Firm—Toren, McGeady & Stanger

[57] ABSTRACT

A single lens reflex camera having a main mirror with a coating which is partly light-permeable in at least a portion thereof, the main mirror being pivotable into and out of an operative position where the light entering through an objective lens is reflected to a focusing screen, while the part of the light which passes through the main mirror is reflected out of the photo-taking light path by an auxiliary mirror positioned separately from the main mirror, and further having an automatic diaphragm actuator for stopping down a diaphragm device in the objective lens mounting. In this camera, the main mirror, the auxiliary mirror and the automatic diaphragm actuator are driven with only one common drive member responsive to actuation of a camera release for driving the main and auxiliary mirrors to flip out of the way of the light to the film and for driving the automatic diaphragm actuator to perform the stopping down operation of the diaphragm device.

33 Claims, 18 Drawing Figures

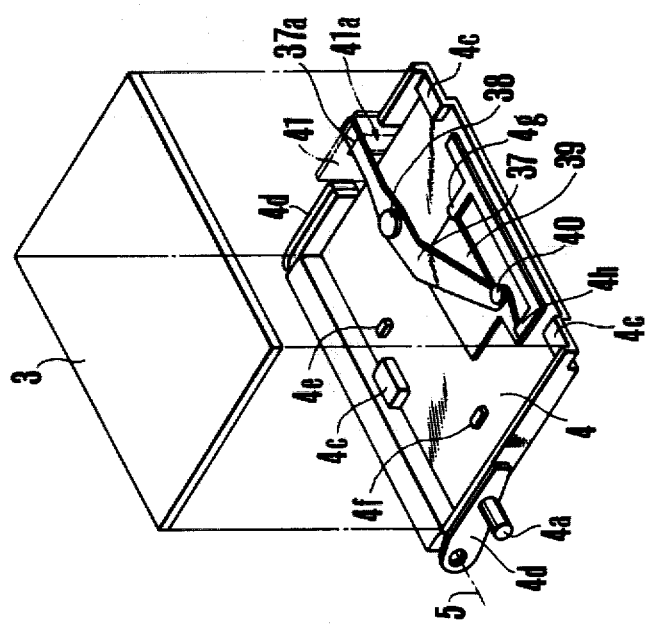

F I G.13
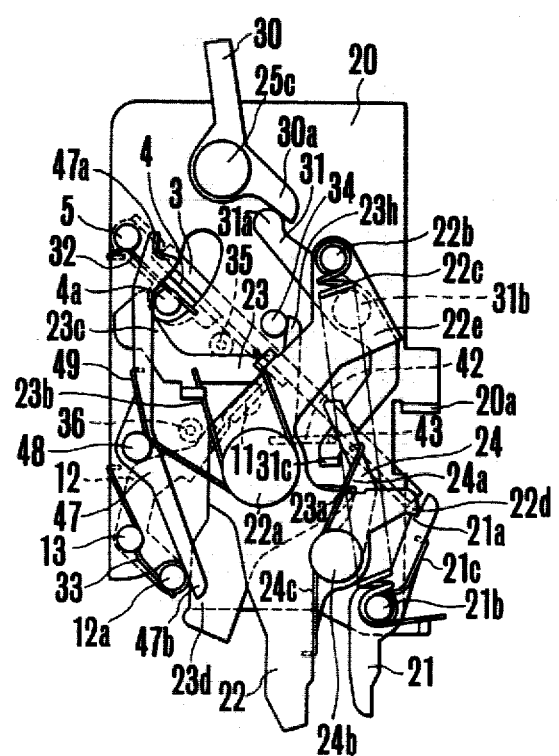

F I G.15
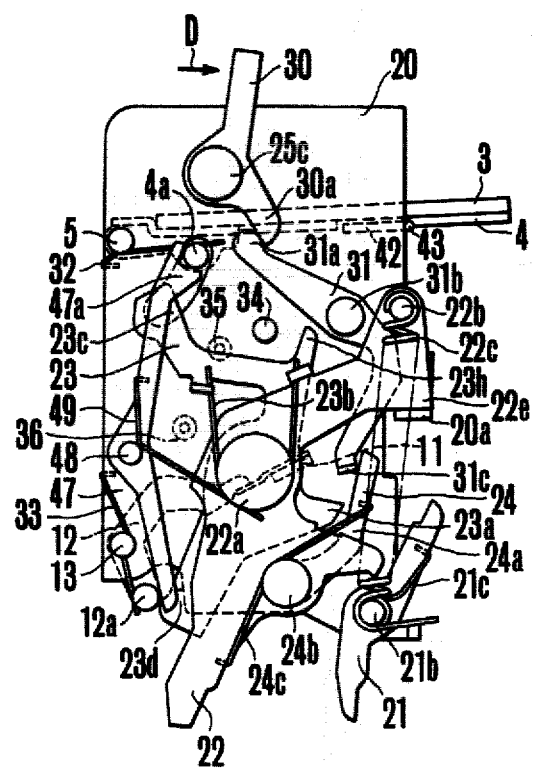

SINGLE LENS REFLEX CAMERA

BACKGROUND OF THE INVENTION

1. Field of the Invention

This invention relates to a single lens reflex camera, and more particularly, to a type of single lens reflex camera in which, while the light coming through an objective lens is reflected to a focusing screen by a main mirror that serves as a beam divider, the part of the light which passes through the main mirror is reflected out from the photo-taking light path by an auxiliary mirror which is positioned to operate independently of the main mirror, and in which the main and auxiliary mirrors are coordinated with each other and, further, there is provided an automatic diaphragm actuating lever for stopping down a diaphragm device in the objective lens mounting.

2. Description of the Prior Art

Many arrangements for focus detection in single lens reflex cameras have been proposed in which a portion of the light entering through an objective lens is directed to a light-sensitive element on which an image of the object is formed, and the output of the light-sensitive element representing a focusing condition at the film plane is utilized either in indicating the detection of a sharp focus, or as a control signal for automatic focus adjustment of the objective lens.

In single lens reflex cameras it is generally accepted from the optical standpoint, or on account of the assurance of coordination of the mirror mechanism, automatic diaphragm mechanism and shutter mechanism, that the light-sensitive element for focus detection or image sensor is arranged in the bottom panel of the mirror box. In order to direct to this light-sensitive element or image sensor a portion of the light coming through the objective lens, a main mirror is made half-mirrored in part or wholly, and an auxiliary mirror is provided behind the main mirror to reflect that portion of the light which passes through the main mirror to the light-sensitive element or image sensor.

Since such auxiliary mirror, when assuming a viewing position, lies in the path of light to the film, in order to make an exposure of the film, it must be moved away from the operative position along with the main mirror for finder. For this purpose, according to the prior art, the auxiliary mirror is hinged on the back of a main mirror support to be pivotable and operates in such a manner that when the main mirror is flipped upward, the auxiliary mirror also follows up and in the terminal position is in light-tight contact with the main mirror, as the mirror assembly is folded.

However, in a particular case where the focus detection is aimed for, as the degree of sharpness of an image formed by the objective lens on the film must be accurately reflected on the image-receiving surface of the light-sensitive element or image sensor, the requirement for precision of the positioning of the auxiliary mirror when in observing the object is so rigorous that such auxiliary mirror arrangement as described above is no longer put into actual practice. Therefore, it is seen here that this auxiliary mirror is arranged independently of the main mirror to facilitate the achievement of the required precision.

On the other hand, single lens reflex cameras are generally provided with an automatic diaphragm actuating member rendering it possible that, when the object is viewed, the diaphragm device in the objective lens mounting is set in the maximum possible aperture opening to perform the so-called light-metering at full open aperture, and when making an exposure of the film, prior to the opening of the shutter, the diaphragm device is stopped down to a required value of aperture. This automatic diaphragm actuating member is arranged to operate in response to a camera release and to complete its movement before the initiation of an exposure.

Therefore, as has been mentioned above, when the auxiliary mirror is provided independently of the main mirror, the result is that the camera has the three members independent of one another, namely, the main mirror, the auxiliary mirror and the automatic diaphragm actuating member. To these three independent members must be imparted respectively required motions by a drive mechanism when an exposure is to be made. In this case, since the above-described three members move independently of one another, said drive mechanism is liable to be complicated and have increased bulk and size. Particularly with the recently developed single lens reflex cameras, the tendency toward small size and compactness is so prominent that it is almost forbidden to use a new additional mechanism, or to increase the complexity and the bulk and size. Thus, in order to employ the mirror arrangement as described above, sufficient consideration must be taken regarding the design of the drive mechanism.

SUMMARY OF THE INVENTION

With the foregoing in mind, it is a principal object of the present invention to provide for a single lens reflex camera of the type having a main movable mirror member for reflecting the light coming through an objective lens to a view finder optical system while simultaneously permitting a portion of the light to pass therethrough to an auxiliary movable mirror member positioned independently of said main mirror member and further having an automatic diaphragm actuating member for stopping down a diaphragm device in the objective lens mounting, with a more advantageously improved drive mechanism for driving, among others, the above-described three members, namely, the main mirror member, the auxiliary mirror member and the automatic diaphragm actuating member to move, the advantage being such that the structure is small and simple and, therefore, assembling and adjustment become very easy, thus contributing to a very large reduction in the unit cost.

To achieve this, according to one of the features of the present invention, the above-described main movable mirror member, auxiliary movable mirror member and automatic diaphragm actuating member are driven with a common and only one drive member. This drive member is arranged to be actuated in response to a camera release and then to move said main and auxiliary mirror members away from the optical path to the film through respective different paths, while simultaneously permitting for the automatic diaphragm actuating member to perform the stopping down operation of the diaphragm device. Thus, a single lens reflex camera having a coordinating system for the main and auxiliary mirror members and the automatic diaphragm actuating member with a greater advantage is proposed.

It should be pointed out here that the length of stroke necessary for the automatic diaphragm actuating member to stop down the diaphragm device from the maximum to the minimum possible aperture opening is usually longer than those of stroke necessary for control members to move the respective mirror members, that is, the main and auxiliary mirrors from their viewing to their non-viewing positions. This difference in the stroke length will give rise to a problem. With regard to this point, according to a preferred embodiment of the invention to be more fully described later, it is proposed that, for example, the drive member is configured with portions acting on the control members for the main and auxiliary mirrors to extend to form escapement cam portions corresponding to the full range of movement of the diaphragm actuating member less the full ranges of movement of the main and auxiliary mirror members, so that after having reached the terminal ends of movement, the main and auxiliary mirror members are maintained stationary in the non-viewing position, despite the further movement of the drive member.

Another object of the present invention is to provide particularly for the main movable mirror member and auxiliary movable mirror member with means rendering it possible to reduce the possibility of occurrence of vibrations when these mirror members reach the terminal ends of movement, as they rebound at the non-viewing positions.

To this end, according to a preferred embodiment of the present invention, the main movable mirror member and auxiliary movable mirror member are urged by respective comparatively weak spring members to move into their operative positions, while the drive member is powered by a spring member which is sufficiently stronger than the total sum of the forces of the spring members of the main and auxiliary mirrors and which is charged during the film winding operation of the camera. When the camera is released, said drive member moves under the action of its own spring member, bringing the main movable mirror member and auxiliary movable mirror member into their inoperative positions outside of the path of light to the film against the forces of their biasing spring members. Thus, the energy of vibrations can be advantageously absorbed.

In this connection, it is to be noted that as the drive member is provided with the above-described escapement cam portions contiguous to the effectively operative portions for the main movable mirror member and auxiliary movable mirror member, these escapement cam portions can, on the other hand, perform an additional function of preventing vibrations when the main movable mirror member and auxiliary movable mirror member reach the non-viewing positions. Even in this point, the provision of the escapement cam portions is very advantageous.

Still another object of the invention is to more advantageously solve a problem which will arise when the main movable mirror member is in the inoperative position outside of the path of light to the film and which is that the backward light entrance from the finder optical system into the mirror box occurs through the light-permeable portion of the main movable mirror member.

To this end, according to a preferred embodiment, it is proposed to provide a slide shutter type light-shielding member between the main movable mirror member and a movable support member for supporting the main mirror member. As the main movable mirror member is moved out of the way of light to the film, said light shielding member is moved to cover the light-permeable area of the main movable mirror member. With this arrangement, because of the light-shielding member being not exposed to the outside, the possibility of damage or the like is very small, and, because of its position being as near to the back surface of the main movable mirror member as possible, there is very little light leakage.

A further object of the present invention is to provide an arrangement of the light-shielding member relative to the light-permeable portion of the main movable mirror member with the advantage that, for example, in the case where the portion of the light which passes through the main mirror to the auxiliary mirror is utilized in measuring the degree of image sharpness, as has already been described above, the resulting error detection due to the incidence on the light-sensitive element of the backward incident light from the finder optical system to pass through the light-permeable portion of said main movable mirror member in its operative position can be also avoided.

To this end, according to a preferred embodiment of the invention, the light-shielding member is hinged on the back portion of the main movable mirror member to be pivotable in such a manner that when the main movable mirror member is in the operative position, though its light-permeable portion is fully opened, the backward incident light from the finder optical system is blocked from reaching the light-sensitive element or image sensor, while when the main movable mirror member is moved to the inoperative position, the light-shielding member is turned to close the light-permeable portion.

With the selection of, in particular, such pivotal type light-shielding as described above for use with the main movable mirror member on the back side thereof, however, when the main movable mirror member and auxiliary movable mirror member return to their operative positions after the exposure has been completed, there is a high possibility that the auxiliary movable mirror member will interfere with the light-shielding member.

A further object of the present invention is, therefore, to eliminate such drawback in a simple way.

To this end, according to a preferred embodiment of the present invention, it is proposed, in combination, to provide a control member causing the initiation of a returning movement of the main mirror member into the operative position to delay until the termination of a returning movement of the auxiliary mirror member into the operative position.

According to the preferred embodiment, it is also proposed in further combination that in order to eliminate even the possibility of a drawback that, as the auxiliary mirror member rebounds when it reaches the operative position, it could interfere with the light-shielding member which consecutively enters the path of light to the film, means is provided for preventing the rebounding of the auxiliary movable mirror member at operative position as it returns thereto.

These and other objects, features and advantages of the present invention will become apparent from the following detailed description of embodiments thereof taken in conjunction with the accompanying drawings.

BRIEF DESCRIPTION OF THE DRAWINGS

The present invention will next be described in connection with preferred embodiments thereof by reference to the drawings in which:

FIGS. 7 and 8 are exploded perspective views of the main parts of an example of a light-shielding means for the light-permeable portion of the main movable mirror member, with FIG. 7 corresponding to the state where the main movable mirror member lies in the path of light to the film, and FIG. 8 corresponding to the state where said main movable mirror member is retracted from the path of light to the film.

FIGS. 13 to 16 are elevational views of a mirror control mechanism including delay means adapted to cooperate with the light-shielding means of FIGS. 10 to 12, with FIG. 13 showing the charged state, FIG. 14 showing the state that the film is being exposed, FIG. 15 showing an intermediate state on the way to the reset state after the completion of the exposure of film, and FIG. 16 showing the state after the subsequent returning movement has been completed.

DETAILED DESCRIPTION OF THE PREFERRED EMBODIMENTS

Figure 1:
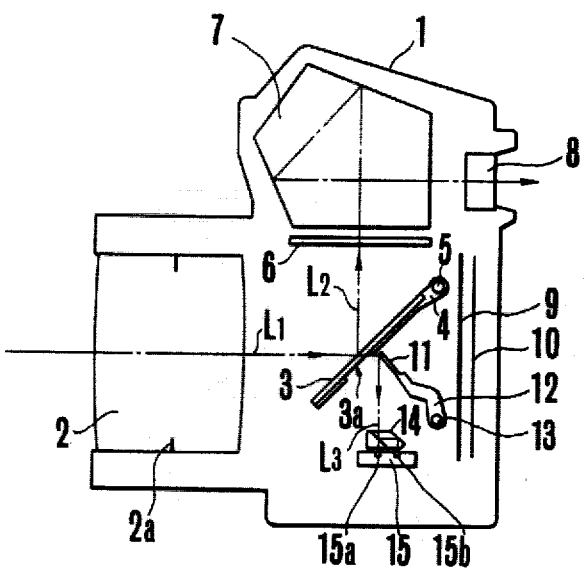
FIGS. 1 and 2 are schematic sectional views of one embodiment of a single lens reflex camera particularly with a mirror and image sensor arrangement according to the present invention, with FIG. 1 showing the main and auxiliary mirrors set in object viewing positions, and FIG. 2 showing their respective inoperative positions when the film is being exposed.
Figure 2:
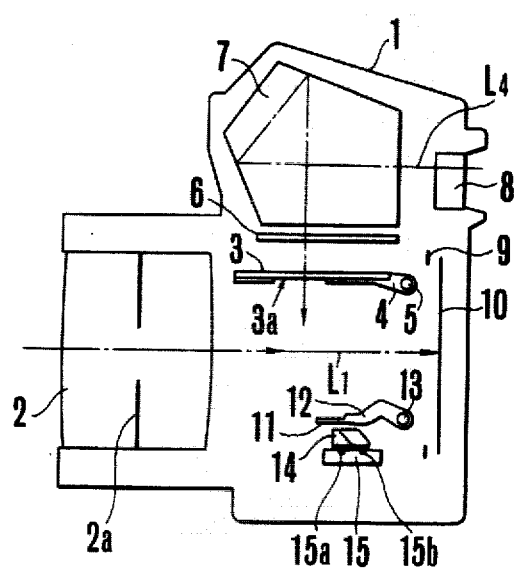

In FIGS. 1 and 2 there is shown a single lens reflex camera having a housing 1 with an objective lens 2 through which light L1 comes to a main mirror 3 and reflected therefrom to a finder optical system. The main mirror 3 is made half-mirrored in a portion 3a. The portion L3 of the light L1 which passes through this half-mirrored portion 3a, is reflected by an auxiliary mirror 11 to a beam splitter 14 where it is further divided into two light bandles which are incident upon respective light-sensitive elements 15a and 15b of a photo-electric light receiving means 15. The light-sensitive elements 15a and 15b are positioned so as to be optically forwardly and rearwardly of a conjugate plane to the film plane respectively by the beam splitter 14, and produce output signals based on which a focus detecting circuit device (not shown) produces a focus detection signal.

It is to be noted that, for the focus detecting circuit, use may be made of the circuit device disclosed in U.S. Patent Application Ser. No. 59,635, filed July 23, 1979, entitled "Focus Detecting Device" by Kinoshita et al assigned to the same assignee of the present invention, or other known circuit devices suited for use with the above system of the two light-sensitive elements.

The light bundle L2 reflected from the main mirror 3 passes through a focusing screen 6, a penta-prism 7 and an eyepiece 8, reaching an eye of the photographer.

When a release of the camera is actuated, the main mirror 3 is turned about a shaft 5 out of the path of light L1 to a film 10, and at the same time, the auxiliary mirror 11 is also turned about a shaft 13 out of the exposure light path. Also a diaphragm 2a in the objective lens mounting is stopped down to the required value of aperture from the maximum possible aperture opening in automatic response to the actuation of camera release. After that, a shutter 9 is opened so that the film 10 is exposed to the light L1. When the exposure of the film 10 is completed, a signal representing the fact that the trailing curtain of the shutter has run down is produced, causing the main mirror 3, auxiliary mirror 11 and diaphragm 2a to return to their respective initial positions of FIG. 1.

Next explanation is made with respect to a mirror control mechanism and an automatic diaphragm actuating mechanism in this camera by reference to FIGS. 3 to 6.

The main mirror 3 is fixedly secured to a support member 4 pivotable about the shaft 5 supported on a base plate 20, as a pin 4a on the side wall of the support 4 is pushed. The auxiliary mirror 11 is mounted on a support member 12 pivotable about the shaft 13 supported on the base plate 20, as a pin 12a on the side wall of the support 12 is pushed. 21 is a latching lever, 22 is a charge lever, 23 is a mirror drive lever, 24 is an arresting lever mounted on said charge lever 22 so as to move the mirror drive lever 23 along with the charge lever 22, 25 is a latch lever, 26 is a shutter start lever, 27 is a shutter release lever, 28 (see FIG. 4) is an automatic diaphragm actuating lever and 29 is a stopper pin therefor, 30 is a lever for receiving a shutter trailing curtain running down completion signal, 31 is a connection release lever, 32 is a spring urging the main mirror 3 to move into the operative position as advances into the path of light for exposure of the film, 33 is a spring urging the auxiliary mirror 11 to move into the operative position as advances into the path of light for exposure of the film, 34 is a stopper for the mirror drive lever 23, 35 is a pin defining the above operative position of the main mirror 3 and 36 is a pin defining the above operative position of the auxiliary mirror 11. These pins 35 and 36 are constructed in the form of eccentric pins for purposes of fine adjustment in positions of the main and auxiliary mirrors.

Figure 3:
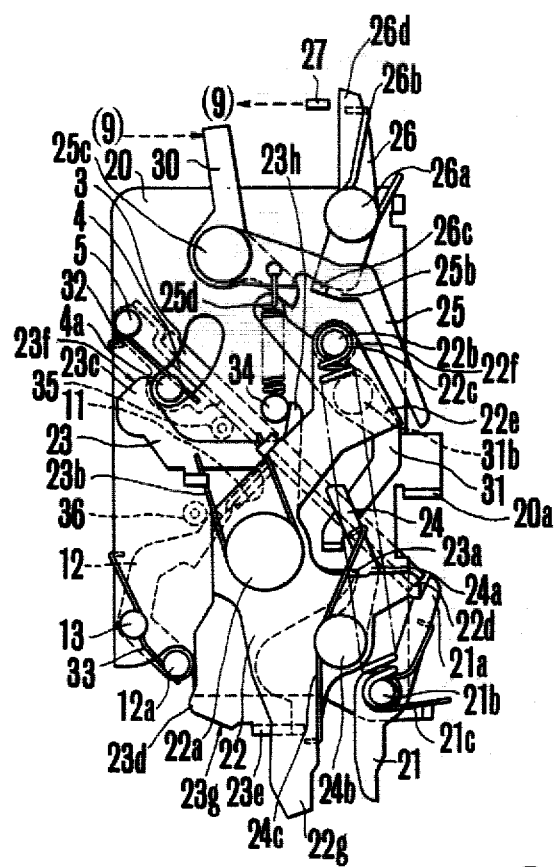
FIGS. 3 to 6 show the details of a control mechanism for the mirrors and automatic diaphragm actuating member of the above-described camera, with FIG. 3 being an elevational view showing a charged state, FIG. 4 being a perspective view of an arrangement of the automatic diaphragm actuating member, FIG. 5 being an elevational view showing an operative state which takes place when the film is being exposed, and FIG. 6 showing a reset state after the exposure of the film is terminated.

In the charged state of FIG. 3, the charge lever 22 is urged to turn in a clockwise direction about an axle 22a under a very strong force of a spring 22c as the mirror drive power source, as the spring 22c is charged to tension between a pin 22b on one arm of the charge lever 22 and an axle 21b on which the latch lever 21 is pivoted, and is maintained in the illustrated position against the drive spring 22 lying in the charged state by a hooked portion 22d engaging a stepped portion 21a of the latch lever 21. It is noted that this drive spring 22c has a far stronger driving force than the sum of the forces of the bias springs 32 and 33 of the main and auxiliary mirrors 3 and 11. Further, the mirror drive lever 23 is pivotally mounted on the axle 22a and is urged to turn in a counterclockwise direction by a spring 23b connected between it and the charge lever 22, but is held in the illustrated position by its one end 23a engaging a hooked portion 24a of the arresting lever 24 on the charge lever 22. It is noted that the arresting lever 24 is pivotally mounted on an axle 24b provided on the lever 22 and is urged by a spring 24c to catch the mirror drive lever 23 at an engaging portion 23a thereof.

The shutter start lever 26 is urged by a spring 26b to turn about an axle 26a in a counterclockwise direction, but is held in the illustrated position by its engaging portion 26c at one end engaging with a hooked portion 25b of the latch lever 25.

Figure 4:
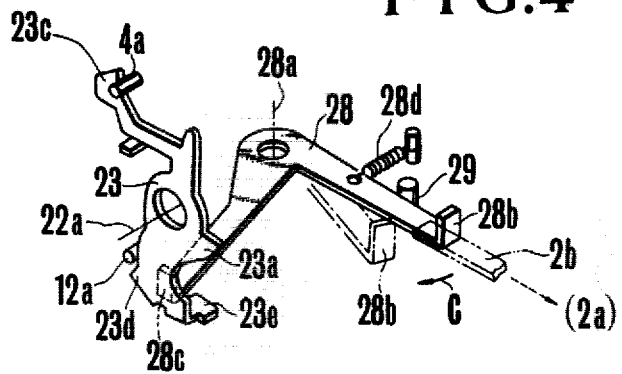

In the above state of FIG. 3, the main mirror 3 and the auxiliary mirror 11 are held by respective springs 32 and 33 in their respective operative positions (where an object to be photographed is viewed) defined by the pins 35 and 36 respectively, and the automatic diaphragm actuating lever 28 for the diaphragm 2a in the objective lens mounting is urged by a spring 28d to turn about an axle 28a in a counterclockwise direction and is held in abutment on the stopper pin 29 as shown in FIG. 4, whereby the diaphragm 2a of the objective lens 2 is set in the full open aperture opening.

Figure 5:
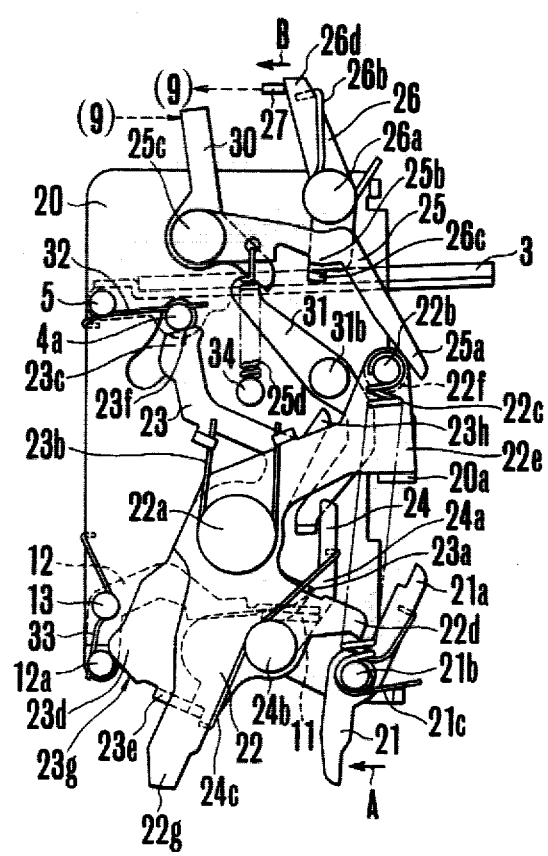

Then, when a shutter release is actuated, a start signal is given to the latch lever 21 in a direction indicated by arrow A in FIG. 5, thereby the latch lever 21 is turned clockwise against a spring 21c and disengaged from the charge lever 22. Then, the charge lever 22 is turned by the force of the spring 22c until its lug 22e abuts against a stopper 20a on the base plate 20. Since the axle 24b of the arresting lever 24 is provided on the charge lever 22, such movement of the charge lever 22 causes clockwise movement of the mirror drive lever 23 about the axle 22a while maintaining engagement with the arresting lever 24. By this, the main mirror drive portion 23c of the mirror drive lever 23 lifts upward the main mirror drive pin 4a provided on the side of the main mirror support member 4, causing the support member 4 to turn counterclockwise about the shaft 5 against the spring 32 and therefore causing the main mirror 3 to flip upward out of the path of light for exposure. Further, at this time, an auxiliary drive portion 23d of the mirror drive lever 23 pushes an auxiliary mirror drive pin 12a provided on the side of the auxiliary mirror support member 12 causing the support member 12 to turn clockwise about the shaft 13 against the spring 33, and therefor causing the auxiliary mirror 11 to turn down out of the path of light for exposure. Since the mirror drive lever 23 is further provided with a bent portion 23e for the automatic actuating lever 28, as the lever 23 turns clockwise, this portion 23e engages with an upwardly standing portion 28c of the diaphragm actuating lever 28 and turns the latter about the axle 28a in a direction indicated by arrow C in FIG. 4 against the spring 28d, thereby one end 28b of the lever 28 pushes a diaphragm stopping down lever 2b in the objective lens mounting. Thus, the diaphragm 2a is closed down to the required value of aperture.

It will be appreciated that the clockwise movement of the mirror drive member or lever 23 results in that the main mirror 3 and auxiliary mirror 11 are retracted to clear the passage of a light beam from the objective lens 2 to the shutter 9, and the diaphragm 2a in the lens mounting is adjusted to the preset aperture opening, thus finally taking the state of FIG. 5.

It should be pointed out that since in this embodiment the active stroke necessary for the automatic diaphragm actuating lever 28 to stop down the diaphragm 2 from the maximum to the minimum possible aperture opening is larger than that necessary for the main and auxiliary mirrors 3 and 11 to move from their respective operative positions of FIG. 3 to their respective inoperative positions of FIG. 5, in order to avoid the drawback due to such active stroke difference, the mirror drive lever 23 is provided for the main mirror drive portion 23c and the auxiliary mirror drive portion 23d with respective escapement cam portions 23f and 23g so that during the excessive active stroke necessitated by the automatic diaphragm actuating lever 28, the main mirror 3 and auxiliary mirror 11 are left stationary in the light passage clearing positions of FIG. 5. By these escapement cam portions 23f and 23g, it is made possible despite the above-described active stroke difference to assure the compatible operation of the main mirror 3 and auxiliary mirror 11 without unduly large stress on the mirror drive lever 23.

It should be also pointed out that since in this embodiment, the spring arrangement is such that while the comparatively weak springs 32 and 33 are acted on the main mirror 3 and the auxiliary mirror 11 respectively to be held at rest in the viewing positions of FIG. 3, a spring having a sufficiently stronger effective force than the sum of the forces of these bias springs 32 and 33 is selected as the drive spring 22c, and the power of the drive spring 22c is transmitted through the mirror drive lever 23 to move both mirrors 3 and 11 to the inoperative positions of FIG. 5, an advantage can be derived that the main mirror 3 and the auxiliary mirror 11 get stopped at the terminal positions of FIG. 5 without causing production of any vibrations due to the rebound.

It should be further pointed out that the use of the escapement cam portions 23f and 23g contiguous to the main and auxiliary mirror drive portions 23c and 23d in the mirror drive lever 23 give rise to an additional advantage that the vibrations of the moving main and auxiliary mirrors 3 and 11 at their respective inoperative positions can be well prevented.

Discussion is now directed to the release operation of the shutter 9. As the mechanism moves from the state of FIG. 3 to the state of FIG. 5, just before the charge lever 22 contacts at its lug 22e with the stopper 20a on the base plate 20, a pin 22f planted on the lever 22 at the end of one arm thereof just behind the spring-bearing pin 22b strikes the latch lever 25 at a tail portion 25a thereof and then turns the latch lever 25 about an axle 25c in a counterclockwise direction against a spring 25d, thereby the shutter start lever 26 is released from the latching connection with the latch lever 25. Then, the start lever 26 is turned in the counterclockwise direction by the action of a spring 26b, while its end 26d simultaneously moving the shutter release lever 27 in a direction indicated by arrow B, thus initiating a release of the shutter 9.

Figure 6:
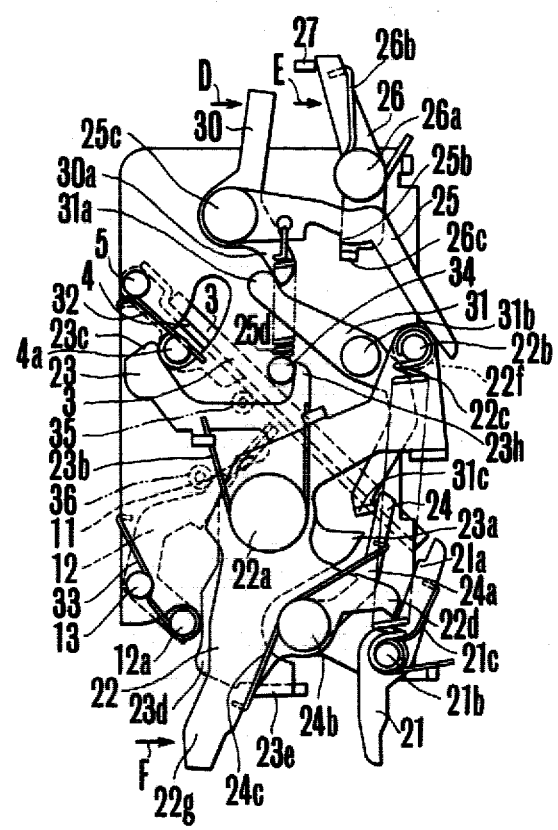

This is followed by the opening and closing operations of the leading and trailing curtains of the shutter 9 in a manner known in the art. When the exposure of the film 10 has been completed, a signal representing the fact that the trailing curtain of the shutter 9 reaches the terminal end of running down movement is produced and drives the lever 30 to move in a direction of arrow D as shown in FIG. 6. Therefore, the lever 30 is turned about the axle 25c in a clockwise direction and its one end 30a pushes one end 31a of the connection release lever 31, thereby the connection release lever 31 is turned about an axle 31b in a counterclockwise direction. During this time, a bent portion 31c of the lever 31 turns the arresting lever 24 about the axle 24b in the clockwise direction against the spring 24c until it is disengaged from the mirror drive lever 23. Then, the mirror drive lever 23 is turned about the axle 22a in the counterclockwise direction by the action of spring 23b and then stopped in a position where its pawled portion 23h abuts on the stopper pin 34. Thus, the mirror drive lever 23 is reset in the position shown in FIG. 6 (FIG. 3). At this returning movement of the mirror drive lever 23 proceeds, the main mirror 3 and the auxiliary mirror 11 are returned under the action of the respective springs 32 and 33 to their respective operative positions shown in FIG. 6 (FIG. 3), and the diaphragm actuating lever 28 is also returned under the action of the spring 28d until it abuts the stopper pin 29 as shown in FIG. 4. In this manner, the diaphragm 2a of the objective lens 2 is fully opened again.

The foregoing operation results in the state of FIG. 6. When to charge from this state to the state of FIG. 3, the film winding operation of the camera may result in giving a force of direction indicated by arrow F to the charge lever 22 at its tail end 22g and also giving a force of direction indicated by arrow E to the shutter start lever 26 at its end 26d.

That is, when the force of direction of arrow F is given to the tail end 22g of the charge lever 22, said lever 22 is turned about the axle 22a in the counterclockwise direction, while the drive spring 22c is simultaneously charged, and then at the charged position, the stepped portion 21a of the latch lever 21 and the hooked portion 22d of the charge lever 22 are engaged with each other under the action of the spring 21c, thereby the charge lever 22 is latched, and at this time the hooked portion 24a of the arresting lever 24 on said charge lever 22 is engaged by the action of the spring 24c with one end 23a of the mirror drive lever 23. Thus, said mirror drive lever 23 is operatively connected to the charge lever 22.

On the other hand, when the force of direction of arrow E is given to the end 26d of the shutter start lever 26, the said lever 26 is turned about the axle 26a in the clockwise direction against the spring 26b, while at this time the counterclockwise movement of the charge lever 22 causes through its pin 22f counterclockwise movement of the latch lever 25 about the axle 25c against the spring 25d. When in the charge completed state, therefore, the hooked portion 25b of the latch lever 25 engages with the engaging portion 26c of the shutter start lever 26 so that the lever 26 is latched. Thus, the charged state of FIG. 3 is regained.

As far as the above-described features of the invention are concerned, when it is desired to make an exposure of the film 10, as shown in FIG. 2, the main mirror 3 is turned about the shaft 5 to clear the light path to the film, and the auxiliary mirror 11 is also turned about the shaft 12 to clear the light path to the film, and after that the shutter 9 is opened to expose the film 10. In this case, though the film 10 is required to be exposed only to the light L1 coming through the objective lens 2, it is unavoidable that a light bundle L4 entering through the eye-piece 8 from the outside of the camera leaks into the mirror box through the half-mirrored portion 3a of the main mirror 3, thus fogging the film 10 to some extent.

The following explanation is provided concerning means for eliminating such objectionable problem arising from the backward leak of light L4 from the finder optical system.

FIGS. 7 and 8 show an example of the answer to such problem. In the figures, there is shown the main mirror 3 of which a portion or the entire area is half-mirrored, as disassembled from the support member 4 therefor which has a rectangular apertured portion 4b for passing the light beam L3 of FIG. 1 to the auxiliary mirror 11 therethrough. In practice, the main mirror 3 is fixedly secured to brackets 4c of the main mirror support member 4 by an adhesive agent or the like. One of a pair of hinged portions 4d of the main mirror support member 4 is provided with the main mirror drive pin 4a. The main mirror support member 4 is pivotable about the shaft 5 between the positions of FIGS. 7 and 8 corresponding to those of FIGS. 1 and 2 respectively.

Pivotally mounted on the main mirror support member 4 is a lever 37 at a pin 38. Further pivotally mounted on one end portion of this lever 37 is a slide type light-shielding plate 39 at a pin 40. The tail end 37a of the lever 37 engages in a cam slot 41a provided in a guide plate 41 which is fixedly mounted on the side wall of the mirror box.

With such mechanism, when the object is being viewed, as shown in FIG. 7, the lever 37 is in an extreme counterclockwise position where the light-shielding plate 39 is retracted from the apertured portion 4b in abutment on stop convex portions 4e and 4f on the main mirror support member 4.

Then, when the drive pin 4a is moved upward by the mirror drive lever 23 in response to the actuation of camera release, the main mirror 3 is pivoted out of the exposure light path to the position of FIG. 2, and at the same time, as shown in FIG. 8, the lever 37 is turned about the pin 38 in a counterclockwise direction as is guided by the cam slot 41, thereby the light-shielding plate 39 covers the aperture portion 4b. Since the main mirror support member 4 has additional convex portions 4g and 4h, the light-shielding plate 39 in the aperture 4b covering position abuts on these convex portions 4g and 4h.

After the exposure of the film 10 is terminated, when the main mirror 3 returns to the viewing position, the lever 37 concurrently takes the position of FIG. 7 again by the cam slot 41a.

It should be pointed out in connection with the above-described mechanism that since the light-shielding plate 39 is arranged in a space between the main mirror 3 and the main mirror support member 4, the accident which may otherwise result from the interference of the said light-shielding plate 39 with an outside member can be avoided, and, since the said light-shielding plate 39 lies as near the back surface of the main mirror 3 as possible, the light leakage or like phenomenon, in the case where the main mirror 3 takes the position shown in FIG. 2, is little produced very much.

Next explanation will be made concerning another example of the light-shielding means.

Figure 9:
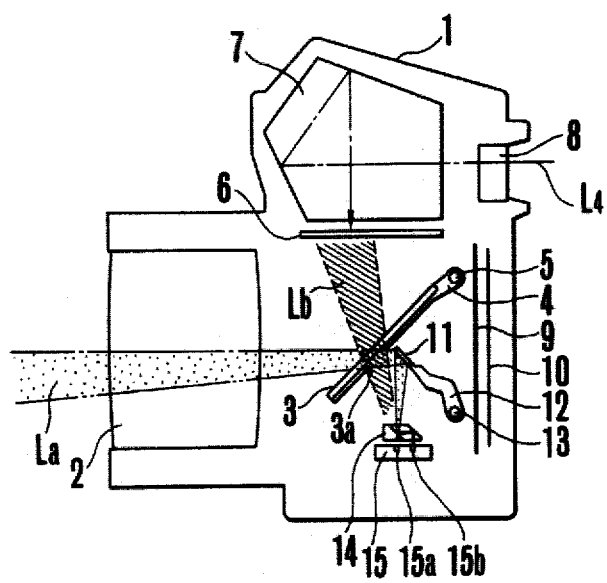
FIG. 9 is a schematic view showing the phenomenon of backward migration of light from the finder optical system when in the object viewing position.

In FIG. 9, the portion La of the light entering through the objective lens 2 which is useful for focus detection passes through the half-mirrored portion 3a of the main mirror 3 to the auxiliary mirror 11 and therefrom reflected to the beam splitter 14 where it is further divided and directed to the light-sensitive elements 15a and 15b of the photo-electric light receiving means 15 for focus detection. Besides this effective light La, there is a possibility that the eye-piece 8 allows light to backwardly enter through the finder optical system (7, 6) and through the half-mirrored portion 3a of the main mirror 3 onto the focus detecting light-sensitive elements 15a and 15b as a harmful light Lb. This leads to the imparting of noise into the outputs of the light-sensitive elements 15a and 15b so that the circuit device will contribute to errors in detection. Especially, as the object brightness decreases while a relatively bright light enters through the eye-piece 8, the probability of faulty operation of the focus detecting circuit will tend to increase.

Figure 10:
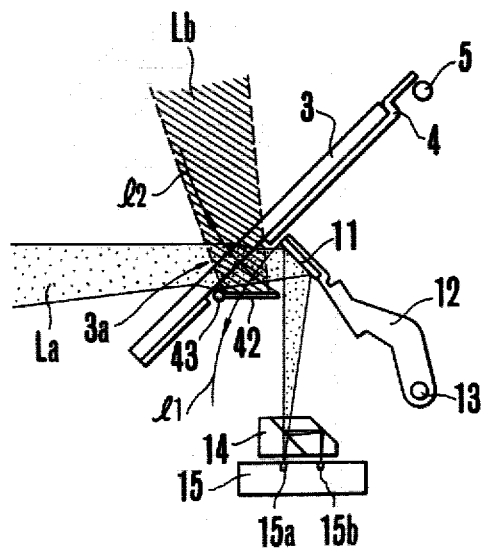
FIGS. 10 and 11 schematically show the outline of the function of a light-shielding means adapted even to prevent the phenomenon mentioned in connection with FIG. 9 with FIG. 10 being a side sectional view corresponding to the state where the main movable mirror member is in its operative position and FIG. 11 being a side sectional view corresponding to the state where said main movable mirror member is in its inoperative position.
Figure 11:
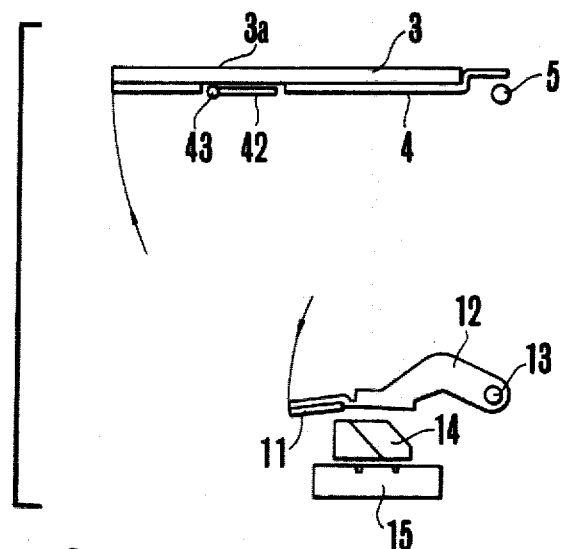

From this standpoint, in the following second example of light-shielding means, as its outline is shown in FIGS. 10 and 11, the main mirror 3 is provided with a light-shielding plate 42 configured in correspondence to the half-mirrored portion 3a and arranged to assume a position of FIG. 10 when the object is being viewed, and upon making of an exposure to close as shown in FIG. 11. That is, the light-shielding plate 42 is pivotally mounted by a shaft 43 on a portion of the main mirror support member 4. In the viewing position of FIG. 10, the light-shielding plate 42 is so oriented that while the effective light bundle La for focus detection which passes through the half-mirrored portion 3a of the main mirror 3 is not blocked in any portions, the harmful light Lb backwardly entering from the finder optical system (8, 7, 6) is prevented from impinging upon the light-sensitive elements 15a and 15b with high efficiency. On the other hand, in the inoperative position of FIG. 11, the light-shielding plate 42 is light-tightly seated on the half-mirrored portion 3a of the main mirror 3 so that the harmful light leak from the finder optical system (8, 7, 6) into the mirror box is prevented.

The details of the arrangement for the above-described light-shielding plate 42 is described by reference to FIG. 12.

Figure 12:
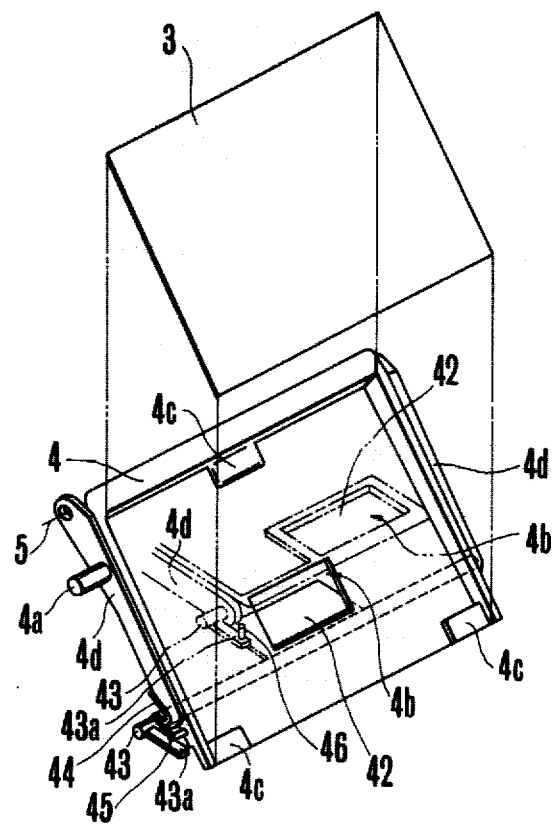
FIG. 12 is an exploded perspective view showing the details of the main parts of the assembly of the main movable mirror member and the light-shielding member of FIGS. 10 and 11 in a position corresponding to the state where the main movable mirror member is in its operative position.

As shown in FIG. 12, the light-shielding plate 42 is fixedly mounted on the shaft 43 which is movably mounted in bearing portions provided in the both hinge portions 4d of the main mirror support member 4, and is urged by a spring 44 in a direction to open the apertured portion 4b. In the illustrated position, a tongue piece 43a radially extending from the shaft 43 abuts a pin 45 planted on the side wall of the main mirror support member 4, thereby the position of the light-shielding plate 42 described in connection with FIG. 10 can be assured. That is, in this position, the light-shielding plate 42 clears the light passage through the apertured portion 4b on one hand, and blocks the light L4 coming through the finder optical system (8, 7, 6) from serving as the harmful light Lb for the focus detection light-sensitive elements 15a and 15b on the other hand.

Then, when the main mirror 3 is pivoted out of the operative position of FIG. 12 by such mirror control mechanism as described above, it occurs at the terminal end of pivotal movement of the main mirror 3 that a closing pin 46 projecting, for example, from the ceiling of the mirror box catches the tongue piece 43a of the shaft 43 and then turns the shaft 43 in a clockwise direction against the spring 45, causing the light-shielding plate 42 to turn in the same direction to a dashed line position, where it intimately contacts with the back surface of the main mirror support member 4 to close its apertured portion 4b. Thus, the position of FIG. 11 is taken so that when to make an exposure of the film, the backward entrance of light L4 from the finder is blocked.

According to such construction and arrangement of the light-shielding means, not only the advantage of preventing the backward light leak from the finder when the main mirror 3 is in the inoperative position but also even an advantage that when the main mirror 3 is in the operative position, the impingement of the backward light entering from the finder on the focus detecting light-sensitive elements 15a and 15b is prevented, can be obtained.

It should be pointed out in connection with the main mirror arrangement including the light-shielding means described by reference to FIGS. 10 to 12 that in general the location of the portion of the picture area for which the focus condition is to be detected is near the center of the area, and therefore that when the effective light bundle La for the focus detection lies within this range, and when it is intended to block the harmful light bundle Lb from the finder optical system, the traces of movement of the free ends of the light-shielding plate 42 and the auxiliary mirror 11 intersect each other as shown in FIG. 10. Therefore, it is required to provide a coordination control for these mirrors 3 and 11 and the light-shielding plate 42. That is, when the mirrors 3 and 11 are moved from the viewing positions of FIG. 10 to the exposure positions of FIG. 11, the main mirror 3 and the auxiliary mirror 11 may start to move almost simultaneously, or the main mirror 3 may start to move slightly earlier followed by the start of movement of the auxiliary mirror 11. Conversely when it is desired to return from the exposure to the viewing positions, it is required that the movement of the main mirror 3 be somewhat retarded to the movement of the auxiliary mirror 11.

Therefore, the following explanation is presented describing an example of embodiment of such function in the mirror control mechanism by reference to FIGS. 13 to 16.

In the figures, 47 is a control lever added from the above-described point of view to aim for retarding the return of the main mirror 3 to the return of the auxiliary mirror 11 when the main and auxiliary mirrors 3 and 11 are to return from the inoperative to the operative positions, pivotally mounted at an axle 48 on the base plate 20, and urged by a spring 49 connected between it and the shaft 22a to turn about said axle 48 in a clockwise direction. The control lever 47 has a stepped portion 47a formed in one end thereof and arranged, upon bringing the main mirror 3 to the exposure light path clearing position, to sustain its drive pin 4a from the below so that said main mirror 3 is hindered from returning to the operative position, and its tail end portion 47b is extended so that when the auxiliary mirror 11 returns to the operative position it occurs just before the auxiliary mirror 11 reaches the operative position that the drive pin 12a of the auxiliary mirror 11 impinges or strikes on said tail end portion 47b.

Besides the above, entirely the same construction as that of the mechanism described by reference to FIGS. 3 to 6 is formed. And, as for the main movable mirror system, the construction described by reference to FIG. 12 is employed without further alteration.

Now, with such control lever 47 added mechanism, first in the charged state of FIG. 13, said control lever 47 as shown in the same figure assumes to be turned about the axle 48 in the clockwise direction by the spring 49 until its tail end portion 47b is restrained by the drive pin 12a of the auxiliary mirror 11. At this time, its stepped portion 47a lies above the drive pin 4a of the main mirror 3.

Figure 14:
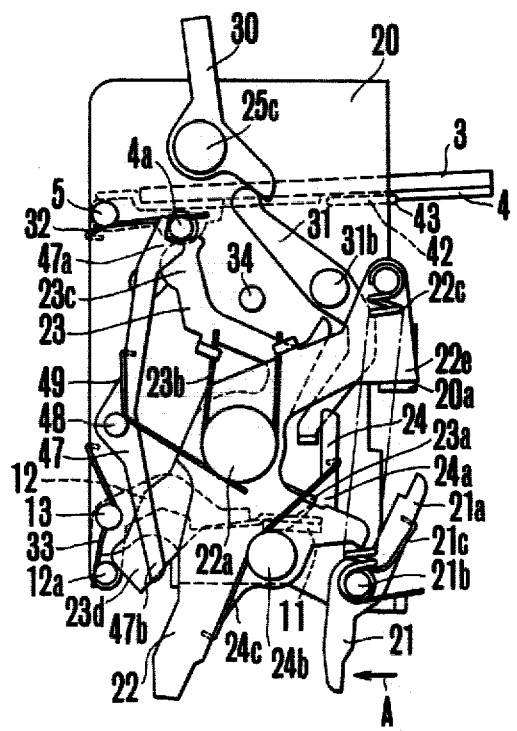
Figure 16:
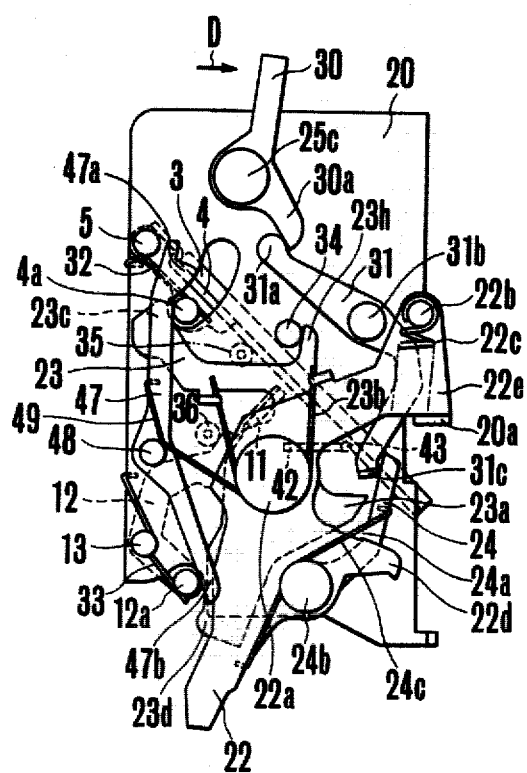

Then, when a camera release is actuated, as the mirror drive lever 23 is turned in the clockwise direction to move the main mirror 3 and the auxiliary mirror 11 out of their operative position through their respective drive pins 4a and 12a against the respective springs 32 and 33, the control lever 47 concurrently turns in the clockwise direction about the axle 48 under the action of the spring 49 along with the clockwise and counterclockwise movements of the mirror drive pins 12a and 4a. Then, at a point of time when the main mirror 3 and auxiliary mirror 11 reach the exposure light passage clearing positions, as shown in FIG. 14, its stepped portion 47a enters below the main mirror drive pin 4a and sustains it, thereby the return of the main mirror 3 into the operative position is inhibited. Then, as the exposure of the film is terminated, as has been described above, the connection release lever 31 releases connection of the mirror drive lever 23 with the charge lever 22 by the arresting lever 24, thereby the mirror drive lever 23 is turned in the counterclockwise direction by the action of the spring 23b. Then, since the main mirror 3 is inhibited from clockwise movement by the control lever 47 engaging at the stepped portion 47a with its drive pin 4a, as shown in FIG. 15, while it is maintained in the exposure light passage clearing position against the spring 32 therefor, only the auxiliary mirror 11 is allowed by the action of its spring 33 to move toward the exposure light blocking position. In the course of returning of said auxiliary mirror 11 to the operative position, at a point of time just before said auxiliary mirror 11 reaches the exposure light blocking position, its drive pin 12a strikes the control lever 47 at its tail end portion 47b. Then the control lever 47 is turned about the axle 48 in the counterclockwise direction against its spring 49. This causes the drive pin 4a to release from arresting engagement with the stepped portion 47a of the control lever 47 and therefore causes the main mirror 3 to start to move into the operative position under the action of the spring 32. At this time, the light-shielding plate 42 also moves to open the light-permeable portion 3a of the main mirror 3 (the apertured portion 4b of the main mirror support member 4). Thus, a reset state of FIG. 16 is attained.

It will be understood that according to the features of the mechanism described in connection with FIGS. 13 to 16, the main mirror 3 and the auxiliary mirror 11 are coordinated with each other to delay the start of return of the main mirror 3 from the start of return of the auxiliary mirror 11, thereby it being made possible to avoid the mechanical interference between the auxiliary mirror 11 and the light-shielding plate 42 even when it is of the pivotal type described in connection with FIGS. 10 to 12, thus always assuring the satisfactory returning operation of the mirror mechanism.

It should now be pointed out that although the problem arising from the attachment of such light-shielding plate 42 as described in connection with FIGS. 10 to 12, that is, the problem of the mechanical interference of said light-shielding plate 42 with the auxiliary mirror 11 which will occur when said main mirror 3 and auxiliary mirror 11 return to the operative positions can be solved by the use of a control lever 47 as has been described in connection with FIGS. 13 to 16, such mechanical interference of the light-shielding plate 42 with the auxiliary mirror 11 is also possible provided that the auxiliary mirror 11 rebounds as its support member 12 strikes the position restricting pin 36 when it returns to the operative position.

Finally, therefore, an example of an improved control mechanism capable of preventing such rebound of the auxiliary mirror 11 at the time of return that leads to the mechanical interference with the light-shielding plate 42, will next be described by reference to FIGS. 17 and 18.

In the figures, 50 is a rebound preventing lever added to aim for preventing the rebound of the auxiliary mirror 11 when it returns to the operative position. The rebound preventing lever 50 is pivotally mounted on the common axle of the above-described control lever 47, and has an abutment portion 50a at one end thereof to abut against a portion 23i of the mirror drive lever 23. Further, its tail end portion 50b is extended so that upon reception of the auxiliary mirror drive pin 12a, its clockwise movement is inhibited. It is noted that said rebound preventing lever 50 is formed so as to be slightly pivotable about the axle 48 in the charged state and the return completed state after the termination of the exposure shown in FIG. 17. 51 is a pin for limiting the clockwise movement of the rebound preventing lever 50 planted on the base plate 20.

It is noted that 33' is, in place of the above-described spring 33, a return control spring urging the auxiliary mirror 11 to move toward the operative position. Here it is connected between the auxiliary mirror drive pin 12a and the pivot axle 48 of the control lever 47 and the rebound preventing lever 50 to urge the auxiliary mirror support member 12 to turn in a counterclockwise direction. The spring 33' in such arrangement has an equivalent function to that of a toggle spring so that as the auxiliary mirror 11 moves from the position of FIG. 17, that is, the operative position, to the position of FIG. 18, that is, the inoperative position, its returning acting gradually weakens. Therefore, an advantage can be derived that the force necessary to bring the said auxiliary mirror 11 from the operative position of FIG. 17 to the inoperative position of FIG. 18 may be reduced to a relatively small value.

Besides the above, entirely the same construction as that of the mechanism described in connection with FIGS. 3 to 6 and FIGS. 13 to 16 applies.

Figure 17:
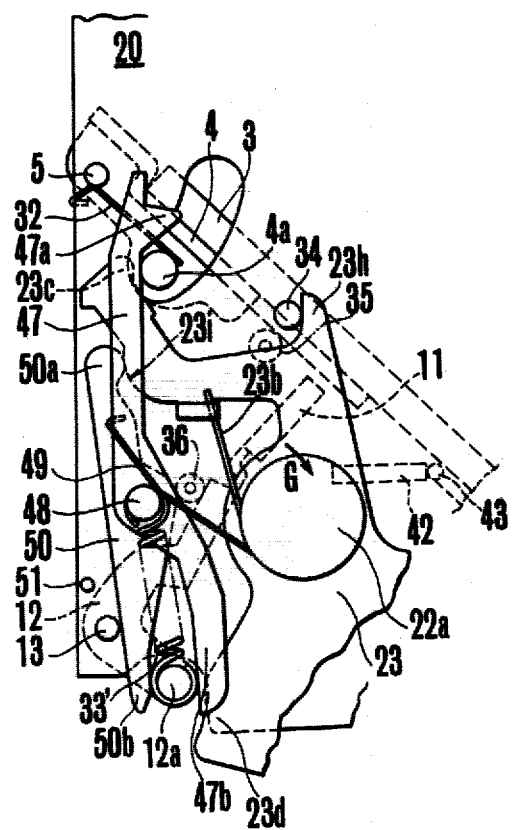
FIGS. 17 and 18 are fragmentary elevational views of the mirror control mechanism of FIGS. 13 to 16 with further inclusion of rebound preventing means, with FIG. 17 showing the charged state or the returned state after the exposure of film is terminated, and FIG. 18 showing the state that the film is being exposed.
Figure 18:
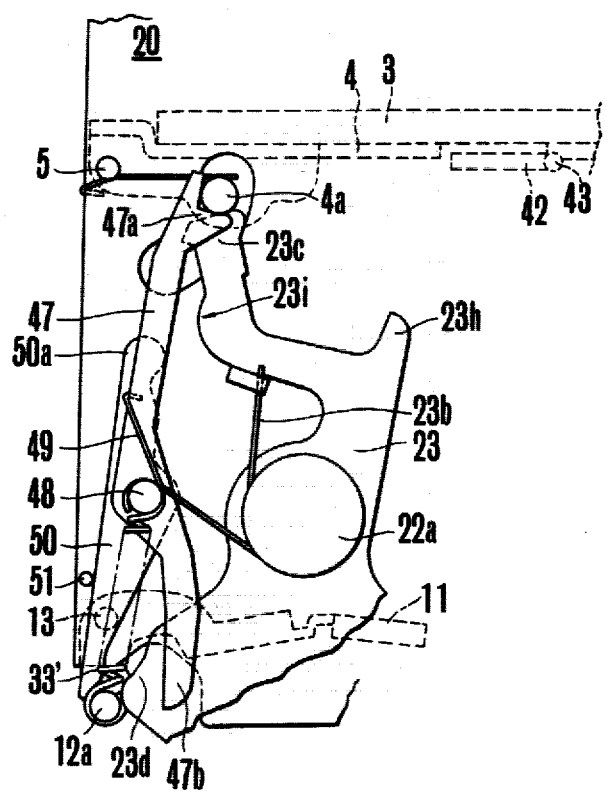

Now, with such rebound preventing lever 50 added mechanism, in the charge state, when a camera release is actuated, as the state of FIG. 17, or the viewing state, is changed to the film exposure state of FIG. 18 and then the viewing state of FIG. 17 is regained, the rebound preventing lever 50 is, meanwhile, turned in the clockwise direction about the axle 48 as is pushed by the auxiliary mirror drive pin 12a in the first half cycle from the state of FIG. 17 to the state of FIG. 18. In the second half cycle from the state of FIG. 18 to the state of FIG. 17, the rebound preventing lever 50 is turned in the counterclockwise direction about the axle 48 as is pushed by one portion 23i of the mirror drive lever 23. In either case, however, said rebound preventing lever 50 only follows up either the auxiliary mirror drive pin 12a or the mirror drive lever 23 and does not perform transmission of any force. Now assuming that the state of FIG. 17 is taken just after the exposure has been completed and is followed by the return to the viewing state, then at a point of time when the auxiliary mirror support member 12 after having turned about the axle 13 in the counterclockwise direction under the elastic force of the spring 33' from the position of FIG. 18 reaches the position of FIG. 17, it strikes the stopper pin 36 and tends to rebound, that is, to turn in a direction of arrow G. When the auxiliary mirror support member 12 gets turned in the clockwise direction, the auxiliary mirror drive pin 12a strikes the rebound preventing lever 50 at the tail end portion 50b, seeking to turn said rebound preventing lever 50 about the axle 48 in the clockwise direction. At this time, however, the abutment portion 50a in the opposite end of said lever 50 is in contact with the portion 23i of the mirror drive lever 23 which has already completed its own returning movement. For this reason, the auxiliary mirror support member 12 trying to turn in the clockwise direction as it rebounds exerts a force by which the mirror drive lever 23 is driven through said lever 50 to turn in the clockwise direction. However, since the mirror drive lever 23 is far heavier in mass than the auxiliary mirror support member 12, and further since the mirror drive lever 23 in as returned state from the exposure state is urged in the counterclockwise direction by the return spring 23b, when the auxiliary mirror support member 12 tries to rebound, the lever 50 functions to apply the load of the mirror drive lever 23 on said auxiliary mirror support member 12 so as to prevent the rebound thereof. Otherwise, suppose the rebounding force of the auxiliary mirror support member 12 is strong enough to be able to turn the mirror drive lever 23 to a large extent through the lever 50. Even if this were the case, as the mirror drive lever 23 turns in the clockwise direction, it comes to abut the main mirror drive pin 4a. From this time onwards, it must drive even the main mirror 3 to turn. Since this load also is applied through the lever 50 to the auxiliary mirror support member 12, it is perfectly impossible for the auxiliary mirror support member 12 to rebound. Moreover, even if it happens that the auxiliary mirror support member 12 stops without having to release the stepped portion 47a of the above-described control lever 47 from engagement with the main mirror drive pin 4a during its returning movement, it is certain that the rotative force of the mirror drive lever 23 in the returning movement can drive the auxiliary mirror support member 12 to turn in the counterclockwise direction through the lever 50 until it reaches the prescribed terminal position. Further, as has been described above, since the rebound of the auxiliary mirror support member 12 is mechanically suppressed, even when the spring 33' is weakened, a reliable operation can be assured. Therefore, the force of the drive spring 22c can be by far weakened.

It will be appreciated that according to the features of the mechanism described in connection with FIGS. 17 and 18, the auxiliary mirror 11 can be reset to its operative position without causing the occurrence of rebound with the advantage that even when the main mirror 3 is assembled with such light-shielding plate 42 as described in connection with FIGS. 10 to 12, there is no possibility of a mechanical interference between said light-shielding plate 42 and the auxiliary mirror 11 or the like, thus always assuring a satisfactory returning operation of the mirror mechanism.

What is claimed is:

1. A single lens reflex camera comprising:
   (A) a viewfinder optical system adapted to observe an image to be formed on a film plane by an objective lens device;
   (B) main movable reflection mirror means for directing an image forming light beam coming from said objective lens device to said viewfinder optical system, said main movable reflection mirror means being movable between a position so advanced into the optical path for exposure as to direct the image forming light beam coming from said objective lens device to said viewfinder optical system and a position so retracted to the outside of said optical path for exposure as to allow said film to be exposed to the image forming light beam coming from said objective lens device, and having a portion for passage at least a portion of the image forming light beam therethrough;
   (C) auxiliary movable reflection mirror means for taking out the light passed through said light-passage allowing portion of said main movable reflection mirror means, said auxiliary movable reflection mirror means being arranged independently of said main movable reflection mirror means and movable between a position so advanced into said optical path for exposure behind said main movable reflection mirror means as to take out a light beam passage through said light-passage allowing portion of said main movable reflection mirror means and a position so retracted to the outside of said optical path for exposure as not to obstruct the exposure of said film to the image-forming light beam coming from said objective lens device;
   (D) diaphragm controlling means for controlling diaphragm means equipped within said objective lens device for defining an exposure aperture opening from maximum possible aperture opening to a required aperture opening; and
   (E) a single drive means common to said movable reflection mirror means, said auxiliary movable reflection mirror means and said diaphragm actuating means for moving said main movable reflection mirror means and said auxiliary movable reflection mirror means from their respective advanced positions to their respective retracted positions and for causing said diaphragm controlling means to control said diaphragm means equipped within said objective lens device, said drive means having a first controlling portion for said main movable reflection mirror means, a second controlling portion for said auxiliary movable reflection mirror means and a third controlling portion for said diaphragm controlling means.

2. A single lens reflex camera according to claim 1, further comprising:
   first urging means for urging said main movable reflection mirror means to return to its advanced position;
   second urging means for urging said auxiliary movable reflection mirror means to return to its advanced position; and
   driving power source means for supplying said drive means with driving force to drive said main movable reflection mirror means, said auxiliary movable reflection mirror means and said diaphragm controlling means, said driving power source means having a stronger force than the combined force of said first and said second urging means so that said drive means, with the driving force given by said driving power source means, moves said main movable reflection mirror means and said auxiliary movable reflection mirror means from their respective advanced positions to their respective retracted positions against said first and said second urging means respectively, and causes said diaphragm controlling means to control said diaphragm means.

3. A single lens reflex camera according to claim 2, wherein said drive means is further provided with:
   a first escapement cam portion contiguous to said first controlling portion for causing said main movable reflection mirror means to be left stopped in its retracted position despite the excessive driving movement of said drive means to said main movable reflection mirror means; and
   a second escapement cam portion contiguous to said second controlling portion for causing said auxiliary movable reflection mirror means to be left stopped in its retracted position despite the excessive driving movement of said drive means to said auxiliary movable reflection mirror means.

4. A single lens reflex camera according to claim 1 or 2 or 3, wherein said main movable reflection mirror means includes:
   a reflection mirror member formed so as to allow the passage of light in at least a portion thereof; and
   a support plate member for supporting said reflection mirror member, said support plate member itself being movable for changeover of said reflection mirror member between said advanced and said retracted positions, and having an apertured portion for allowing the passage of the light beam which has passed through said reflection mirror member;
   and wherein said camera further comprises:
   movable light-shielding means for selectively opening and closing said apertured portion of said support plate member in said main movable reflection mirror means, said light-shielding means being arranged between said reflection mirror member and said support plate member to be movable therebetween; and control means for controlling the operation of said light-shielding means in association with the changeover of said main movable reflection mirror means between its advanced position and its retracted position in such a manner that when said main movable reflection mirror means lies in its advanced position, said light-shielding means is caused to open said apertured portion of said support plate member, and when said main movable reflection mirror means lies in its retracted position, said light-shielding means is caused to close said apertured portion of said support plate member.

5. A single lens reflex camera according to claim 4, wherein said light-shielding means is slidable in a space between said reflection mirror member and said support plate member in said main movable reflection mirror means along the plate surface of said support plate member, and said control means includes cam means for controlling the sliding movement of said light-shielding means.

6. A single lens reflex camera according to any one of claim 1 or 2 or 3, further comprising:
   movable light-shielding means for selectively opening and closing said light-passage allowing portion of said main movable reflection mirror means, said light-shielding means being movable between a first position where said light-passage allowing portion of said main movable reflection mirror means is opened to said auxiliary movable reflection mirror means and at the same time the portion of the light other than said image forming light beam coming from said objective lens device which passes through said light-passage allowing portion of said reflection mirror member is blocked and a second position where said light-passage allowing portion is closed; and
   control means for controlling the changeover of said light-shielding means in association with the changeover of said main movable reflection mirror means between its advanced position and its retracted position in such a manner that when said main movable reflection mirror means lies in its advanced position, said light-shielding means is caused to lie in said first position, and when said main movable reflection mirror means lies in its retracted position, said light-shielding means is caused to lie in said second position.

7. A single lens reflex camera according to claim 6, wherein said main movable reflection mirror means includes:
   a reflection mirror member formed so as to allow the passage of light in at least a portion thereof; and
   a support plate member for supporting said reflection mirror member, said support plate member itself being movable for changeover of said reflection mirror member between said advanced and said retracted positions, and having a rectangular apertured portion formed with upper and lower edges and left and right side edges for allowing the passage of the light beam which has passed through said reflection mirror member;
   and wherein said light-shielding means is mounted on one portion of said support plate member so as to be pivotable about an axle line along the lower edge of said rectangular apertured portion in said support plate member between said first and said second positions.

8. A single lens reflex camera according to claim 7, wherein said light-shielding means is controlled by said control means in such a manner that when in said first position, it stands at a predetermined angle with the back surface of said support plate member so as to open the apertured portion of the support plate member, and when in said second position, it lies along the back surface of said support plate member so as to close the apertured portion of the support plate member.

9. A single lens reflex camera according to claim 7, further comprising:
   retarding means for retarding the return of said main movable reflection mirror means to the return of said auxiliary movable reflection mirror means when said main movable reflection mirror means and said auxiliary movable reflection mirror means are returned from their respective retracted positions to their respective advanced positions.

10. A single lens reflex camera according to claim 9, wherein said retarding means is arranged to latch said main movable reflection mirror means in its retracted position until at least said auxiliary movable reflection mirror means reaches a point just before its advanced position, and upon reaching of said auxiliary movable reflection mirror means to said point to release the latching of said main movable reflection mirror means.

11. A single lens reflex camera according to claim 9, further comprising:
rebound preventing means for preventing said auxiliary movable reflection mirror means from rebounding at said advanced position as it returns from its retracted position to its advanced position.

12. A single lens reflex camera according to claim 11, wherein said main movable reflection mirror means and said auxiliary movable reflection mirror means are arranged to return from their respective retracted positions to their respective advanced positions when said drive means returns to its initial position, and wherein said rebound preventing means is arranged to prevent said auxiliary movable reflection mirror means from rebounding at its advanced position in association with the returning movement of said drive means to its initial position.

13. A single lens reflex camera according to claim 7, further comprising:
rebound preventing means for preventing said auxiliary movable reflection mirror means from rebounding at said advanced position as it returns from its retracted position to its advanced position.

14. A single lens reflex camera according to claim 13, wherein said movable reflection mirror means and said auxiliary movable reflection mirror means are arranged to return from their respective retracted positions to their respective advanced positions when said drive means returns to its initial position and wherein said rebound preventing means is arranged to prevent said auxiliary movable reflection mirror means from rebounding at its advanced position in association with the returning movement of said drive means to its initial position.

15. A single lens reflex camera according to claim 6, further comprising:
retarding means for retarding the return of said main movable reflection mirror means to the return of said auxiliary movable reflection mirror means when said main movable reflection mirror means and said auxiliary movable reflection mirror means are returned from their respective retracted positions to their respective advanced positions.

16. A single lens reflex camera according to claim 15, wherein said retarding means is arranged to latch said main movable reflection mirror means in its retracted position until at least said auxiliary movable reflection mirror means reaches a point just before its advanced position, and upon reaching of said auxiliary movable reflection mirror means to said point to release the latching of said main movable reflection mirror means.

17. A single lens reflex camera according to claim 15, further comprising:
rebound preventing means for preventing said auxiliary movable reflection mirror means from rebounding at said advanced position as it returns from its retracted position to its advanced position.

18. A single lens reflex camera according to claim 17, wherein said main movable reflection mirror means and said auxiliary movable reflection mirror means are arranged to return from their respective retracted positions to their respective advanced positions when said drive means returns to its initial position, and wherein said rebound preventing means is arranged to prevent said auxiliary movable reflection mirror means from rebounding at its advanced position in association with the returning movement of said drive means to its initial position.

19. A single lens reflex camera according to claim 6, further comprising:
rebound preventing means for preventing said auxiliary movable reflection mirror means from rebounding at said advanced position as it returns from its retracted position to its advanced position.

20. A single lens reflex camera according to claim 19, wherein said main movable reflection mirror means and said auxiliary movable reflection mirror means are arranged to return from their respective retracted positions to their respective advanced positions when said drive means returns to its initial position, and wherein said rebound preventing means is arranged to prevent said auxiliary movable reflection mirror means from rebounding at its advanced position in association with the returning movement of said drive means to its initial position.

21. A single lens reflex camera comprising:
(A) a viewfinder optical system adapted to observe an image to be formed on a film plane by an objective lens device;
(B) main movable reflection mirror means for directing an image forming light beam coming from said objective lens device to said viewfinder optical system, said main movable reflection mirror means being movable between a position so advanced into the optical path for exposure as to direct the image forming light beam coming from said objective lens device to said viewfinder optical system and a position so retracted to the outside of said optical path for exposure as to allow said film to be exposed to the image forming light beam from said objective lens device, and including:
(B-1) a reflection mirror member formed so as to allow passage of light in at least a portion thereof; and
(B-2) a support plate member for supporting said reflection mirror member, said support plate member itself being movable for changeover of said reflection mirror member between said advanced and said retracted positions, and having an apertured portion for allowing passage of the light beam which has passed through said reflection mirror member;
(C) auxiliary movable reflection mirror means for taking out the light passed through said apertured portion of said support plate member in said main movable reflection mirror means, said auxiliary movable reflection mirror means being arranged independently of said main movable reflection mirror means and movable between a position so advanced into said optical path for exposure behind said main movable reflection mirror means as to take out a light beam passage through said apertured portion of said support plate member in said main movable reflection mirror means and a position so retracted to the outside of said optical path for exposure as not to obstruct the exposure of said film to the image-forming light beam coming from said objective lens device;
(D) drive means for moving said main movable reflection mirror means and said auxiliary movable reflection mirror means from their respective advanced positions to their respective retracted positions;

(E) movable light-shielding means for selectively opening and closing said apertured portion of said support plate member in said main movable reflection mirror means, said light-shielding means being arranged between said reflection mirror member and said support plate member to be movable therebetween; and (F) control means for controlling the operation of said light-shielding means in association with the changeover of said main movable reflection mirror means between its advanced position and its retracted position in such a manner that when said main movable reflection mirror means lies in its advanced position, said light-shielding means is caused to open said apertured portion of said support plate member, and when said main movable reflection mirror means lies in its retracted position, said light-shielding means is caused to close said apertured portion of said support plate member.

22. A single lens reflex camera according to claim 21, wherein said light-shielding means is slidable in a space between said reflection mirror member and said support plate member in said main movable reflection mirror means along the plate surface of said support plate member, and said control means includes cam means for controlling the sliding movement of said light-shielding means.

23. A single lens reflex camera according to claim 21 or 22, further comprising:

(G) first urging means for urging said main movable reflection mirror means to return to its advanced position;

(H) second urging means for urging said auxiliary movable reflection mirror means to return to its advanced position; and (I) driving power source means for supplying said drive means with driving force to drive said main movable reflection mirror means and said auxiliary movable reflection mirror means, said driving power source means having a stronger force than the combined force of said first and said second urging means so that said drive means, with the driving force given by said driving power source means, moves said main movable reflection mirror means and said auxiliary movable reflection mirror means from their respective advanced positions to their respective retracted positions against said first and said second urging means respectively.

24. A single lens reflex camera according to claim 22, wherein said drive means is provided with:

a first escapement cam portion contiguous to a first acting portion for said main movable reflection mirror means for causing said main movable reflection mirror means to be left stopped in its retracted position despite the excessive driving movement of said drive means to said main movable reflection mirror means; and a second escapement cam portion contiguous to a second acting portion for said auxiliary movable reflection mirror means for causing said auxiliary movable reflection mirror means to be left stopped in its retracted position despite the excessive driving movement of said drive means to said auxiliary movable reflection mirror means.

25. A single lens reflex camera comprising:

(A) a viewfinder optical system adapted to observe an image to be formed on a film plane by an objective lens device;

(B) main movable reflection mirror means for directing an image forming light beam coming from said objective lens device to said viewfinder optical system, said main movable reflection mirror means being movable between a position so advanced into the optical path for exposure as to direct the image forming light beam coming from said objective lens device to said viewfinder optical system and a position so retracted to the outside of said optical path for exposure as to allow said film to be exposed to the image forming light beam from said objective lens device, and having a portion for passage at least a portion of the image forming light beam therethrough;

(C) auxiliary movable reflection mirror means for taking out the light passed through said light-passage allowing portion of said main movable reflection mirror means, said auxiliary movable reflection mirror means being arranged independently of said main movable reflection mirror means and movable between a position so advanced into said optical path for exposure behind said main movable reflection mirror means as to take out a light beam passage through said light-passage allowing portion of said main movable reflection mirror means and a position so retracted to the outside of said optical path for exposure as not to obstruct the exposure of said film to the image-forming light beam coming from said objective lens device;

(D) drive means for moving said main movable reflection mirror means and said auxiliary movable reflection mirror means from their respective advanced positions to their respective retracted positions;

(E) movable light-shielding means for selectively opening and closing said light-passage allowing portion of said main movable reflection mirror means, said light-shielding means being movable between a first position where said light-passage allowing portion of said main movable reflection mirror means is opened to said auxiliary movable reflection mirror means and at the same time the portion of the other light than said image forming light beam coming from said objective lens device which passes through said light-passage allowing portion of said reflection mirror member is blocked and a second position where said light-passage allowing portion is closed; and (F) control means for controlling the changeover of said light-shielding means in association with the changeover of said main movable reflection mirror means between its advanced position and its retracted position in such a manner than when said main movable reflection mirror means lies in its advanced position, said light-shielding means is caused to lie in said first position, and when said main movable reflection mirror means lies in its retracted position, said light-shielding means is caused to lie in said second position.

26. A single lens reflex camera according to claim 25, wherein said main movable reflection mirror means includes:

a reflection mirror member formed so as to allow the passage of light in at least a portion thereof; and a support plate member for supporting said reflection mirror member, said support plate member itself being movable for changeover of said reflection mirror member between said advanced and said retracted positions, and having rectangular apertured portion formed with upper and lower edges and left and right side edges for allowing the passage of the light beam which has passed through said reflection mirror member;

and wherein said light-shielding means is mounted on one portion of said support plate member so as to be pivotable about an axle line along the lower edge of said rectangular apertured portion in said support plate member between said first and said second positions.

27. A single lens reflex camera according to claim 26, wherein said light-shielding means is controlled by said control means in such a manner that when in said first position, it stands at a predetermined angle with the back surface of said support plate member so as to open the apertured portion of the support plate member, and when in said second position, it lies along the back surface of the support plate member so as to close the apertured portion of the support plate member.

28. A single lens reflex camera according to claim 25 or 26 or 27, further comprising:
retarding means for retarding the return of said main movable reflection mirror means to the return of said auxiliary movable reflection mirror means when said main movable reflection mirror means and said auxiliary movable reflection mirror means are returned from their respective retracted positions to their respective advanced positions.

29. A single lens reflex camera according to claim 28, wherein said retarding means is arranged to latch said main movable reflection mirror means in its retracted position until at least said auxiliary movable reflection mirror means reaches a point just before its advanced position, and upon reaching of said auxiliary movable reflection mirror means to said point to release the latching of said main movable reflection mirror means.

30. A single lens reflex camera according to claim 28, further comprising:
rebound preventing means for preventing said auxiliary movable reflection mirror means from rebounding at said advanced position as it returns from its retracted position to its advanced position.

31. A single lens reflex camera according to claim 30, wherein said main movable reflection mirror means and said auxiliary movable reflection mirror means are arranged to return from their respective retracted positions to their respective advanced positions when said drive means returns to its initial position, and wherein said rebound preventing means is arranged to prevent said auxiliary movable reflection mirror means from rebounding at its advanced position in association with the returning movement of said drive means to its initial position.

32. A single lens reflex camera according to claim 25 or 26 or 27, further comprising:
rebound preventing means for preventing said auxiliary movable reflection mirror means from rebounding at said advanced position as it returns from its retracted position to its advanced position.

33. A single lens reflex camera according to claim 32, wherein said movable reflection mirror means and said auxiliary movable reflection mirror means are arranged to return from their respective retracted positions to their respective advanced positions when said drive means returns to its initial position, and wherein said rebound preventing means is arranged to prevent said auxiliary movable reflection mirror means from rebounding at its advanced position in association with the returning movement of said drive means to its initial position.

* * * * *